United States Patent [19]

Amundson et al.

[11] Patent Number: 4,759,020

[45] Date of Patent: Jul. 19, 1988

[54] SELF-HEALING BUBBLE MEMORIES

[75] Inventors: Dennis L. Amundson, Bloomington; Gerald L. Brown, Savage; Raymond C. Hedin, Apple Valley; Samuel A. Meddaugh, Eagan, all of Minn.

[73] Assignee: Unisys Corporation, Blue Bell, Pa.

[21] Appl. No.: 780,129

[22] Filed: Sep. 25, 1985

[51] Int. Cl.$^4$ .............................................. G06F 11/10
[52] U.S. Cl. ........................................ 371/10; 365/1; 371/38
[58] Field of Search ................ 371/38, 51, 10; 365/1, 365/15

[56] References Cited

U.S. PATENT DOCUMENTS

| Re. 30,732 | 9/1981 | Gergis ................................... 365/15 |
| 3,422,402 | 1/1969 | Sakalay ................................. 371/10 |
| 3,434,116 | 3/1969 | Anacker ................................ 371/10 |
| 3,693,159 | 9/1972 | Hilberg ............................... 340/172.5 |
| 3,792,450 | 2/1975 | Bogar et al. ................ 340/174 ED |
| 3,891,969 | 6/1975 | Christensen ............................. 371/3 |
| 3,906,200 | 9/1975 | Petschauer ............................ 371/10 |
| 3,909,810 | 9/1975 | Naden et al. ................ 340/174 ED |
| 3,917,933 | 11/1975 | Scheuneman et al. ............... 371/10 |
| 3,921,156 | 11/1975 | Yoshimi ........................... 340/174 T |
| 3,950,732 | 4/1976 | Chang et al. ..................... 340/172.5 |
| 3,990,058 | 11/1976 | Archer et al. ...................... 340/174 |
| 4,027,283 | 5/1977 | Tang .................................. 371/51 X |
| 4,070,651 | 1/1978 | Naden ................................... 365/15 |
| 4,073,012 | 2/1978 | Ohnigian et al. ........................ 365/1 |
| 4,115,759 | 9/1978 | Besenfelder ............................. 371/1 |
| 4,187,554 | 2/1980 | Kammann ............................ 365/15 |

(List continued on next page.)

OTHER PUBLICATIONS

Lignos, Demetrios, "Error Detection and Correction in Mass Storage Equipment", Computer Design, Oct. 1972, pp. 71-75.

Madren, Frank S., "Memory Error Correction: More Than Just a Bit Better Than Parity", Control Engineering, May 1975, pp. 36-38.

Lin, Yeong S. and Sanders, Ian L., "Contiguous-Element Memories Increase Storage Tenfold", IEEE Spectrum, Feb. 1981, pp. 30-34.

Free, John, "Magnetic Bubbles—New Designs Shrink Computer Memories", Popular Science, Oct. 1979, pp. 49-54.

Herrick, Kennan C., "A PROM-Based Decoder Detects and Corrects Errors", EDN, Jun. 20, 1980, pp. 169-172.

Montgomery, Richard C., "Simple Hardware Approach to Error Detection and Correction", Computer Design, Nov. 1978, pp. 109-118.

Reyling Jr., P. K. George, "Bubble Memories Come to the Boil", Electronics, Aug. 2, 1979, pp. 99-108.

Primary Examiner—Charles E. Atkinson
Attorney, Agent, or Firm—Glenn W. Bowen; Laurence J. Marhoefer

[57] ABSTRACT

A block replicate magnetic bubble memory organization is disclosed in which a number of storage loops are arranged between write and read tracks. Data in the read track is supplied to a deskewing circuit under the control of one section of an EAPROM so that the deskewing circuit outputs one page at a time, where each bit of the page is derived from a different storage loop, to a buffer and error correcting circuit which supplies corrected information to a data processing system as long as only one error bit has occurred on a page. If an error does occur in a page, the processor which has stored in it information relating to all of the used and unused loops of the system, controls another section of the EAPROM so that the defective loop will be exchanged for a good loop after a predetermined number of failures have occurred for the particular bad loop. The write side of the EAPROM is subsequently updated by the processor or remote processor that utilizes the read-out data. Data which is stored in the buffer and has been corrected by the error correcting circuitry is supplied to the skewing circuit under the control of the write side of the EAPROM so it may be written back into the loops of the bubble memory.

2 Claims, 1 Drawing Sheet

U.S. PATENT DOCUMENTS

| | | | |
|---|---|---|---|
| 4,202,043 | 5/1980 | Quadri | 365/15 |
| 4,216,541 | 8/1980 | Clover et al. | 371/38 |
| 4,228,522 | 10/1980 | George | 365/15 |
| 4,233,669 | 11/1980 | Furukawa et al. | 365/15 |
| 4,234,935 | 11/1980 | Schreiner | 365/15 |
| 4,270,186 | 5/1981 | Flannery | 365/15 |
| 4,290,117 | 9/1981 | Sugie et al. | 365/15 |
| 4,291,389 | 9/1981 | Toth | 365/15 |
| 4,301,516 | 11/1981 | Ellsworth | 365/15 |
| 4,308,593 | 12/1981 | Young et al. | 365/15 |
| 4,321,692 | 3/1981 | Quadri | 365/15 |
| 4,321,693 | 3/1982 | Naden | 365/15 |
| 4,333,162 | 6/1982 | Reyling | 365/15 |
| 4,345,328 | 8/1982 | White | 371/38 |
| 4,346,454 | 8/1982 | George | 365/15 |
| 4,354,253 | 10/1982 | Naden | 365/15 |
| 4,376,300 | 3/1983 | Tsang | 365/200 |
| 4,415,988 | 11/1983 | Komenou et al. | 365/16 |
| 4,415,989 | 11/1983 | Sakamoto | 365/19 |
| 4,415,990 | 11/1983 | Gergis et al. | 365/41 |
| 4,517,663 | 5/1985 | Imazeki et al. | 365/222 |
| 4,519,049 | 5/1985 | Toyooka et al. | 365/12 |
| 4,527,251 | 7/1985 | Nibby et al. | 364/900 |

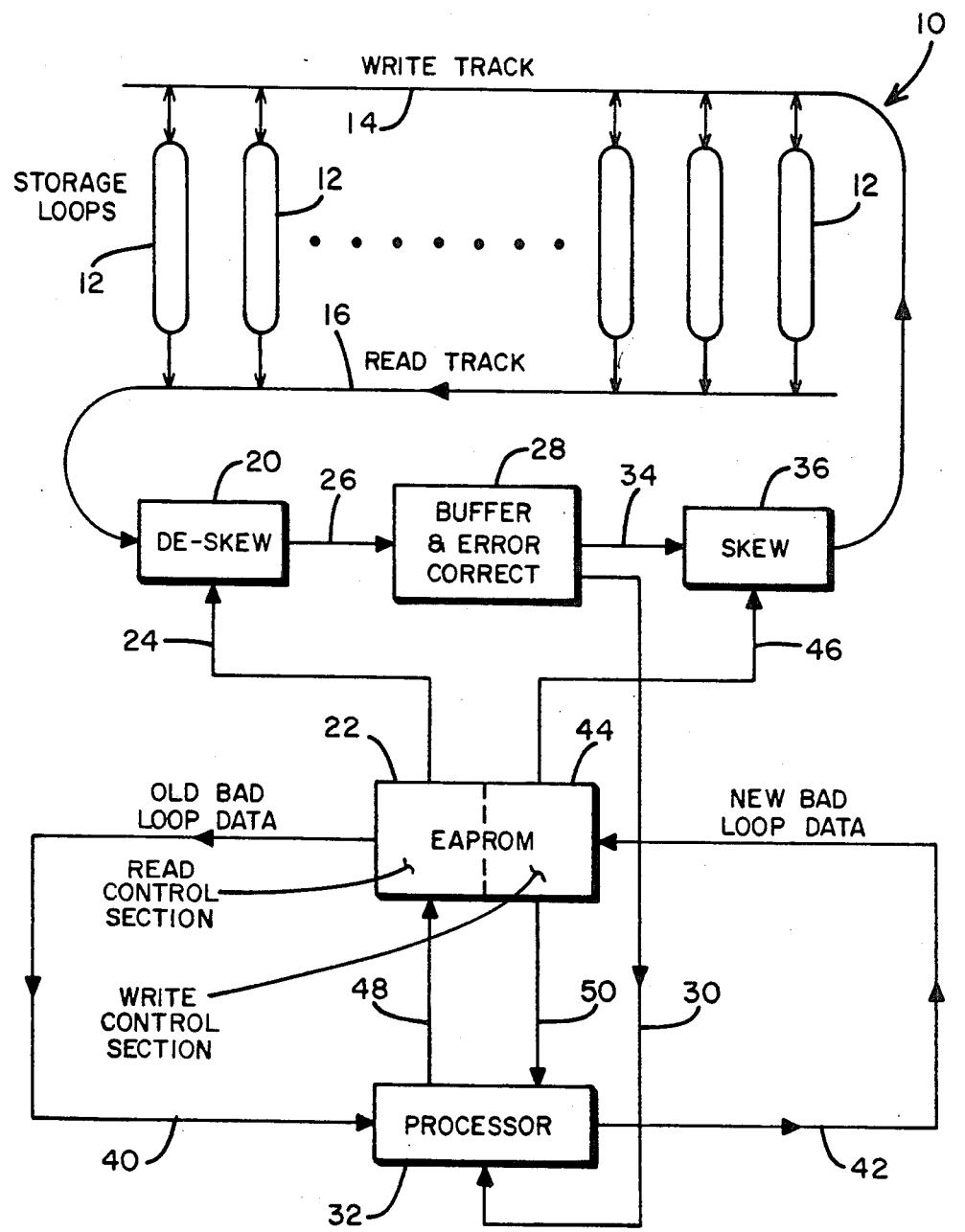

SELF-HEALING BUBBLE MEMORIES

BACKGROUND OF THE INVENTION

The present invention relates to magnetic bubble memories and more particularly to a self-healing bubble memory having error correcting capabilities for the data of the memory, and dynamic reordering of an electrically alterable programmable read only memory (EAPROM) which stores data identifying good and bad storage loops.

Large scale bubble memory systems, particularly those with hundreds, or even thousands, of storage loops inevitably have a significant number of defective loops. Several different architectural organizations of magnetic bubble memories have been devised. The organization currently in favor uses many storage loops around which magnetic domains ("bubbles") are propagated by an in-plane rotating magnetic field. The storage loops are linked on one end by a write track aligned perpendicular to the storage loops and similarly on the other end by a read track.

When such devices are manufactured, a number or redundant loops are included which may be substituted for bad loops. Data pertaining to the locations of the defective loops are stored in separate magnetic bubble loops. Since these storage bubble loops are subject to developing defects with time, this solution, however, is not completely satisfactory. An improvement of this technique was disclosed in U.S. Pat. No. 4,070,651 issued Jan. 24, 1978 which disclosed the use of nonvolatile semiconductor memory, for example a programmable read only memory (PROM), for storage of the identity of defective minor loops so that data would not be read out of a defective loops, nor would data be written into a defective loop.

While use of such a PROM was satisfactory upon initialization of such memory device, it required the replacement of the PROM with an entirely new PROM when defects in the bubble memory developed during operation and memory chips had to be replaced. U.S. Pat. No. 4,354,253 which issued Oct. 12, 1982, disclosed a further improvement in which an erasable programmable read only memory that was initialized upon manufacture of the bubble memory was erased and reprogrammed if a memory chip was replaced during servicing.

While keeping track of the initial defects of a bubble memory system is important, the most frequent fault that occurs in bubble memory systems is that as they age, they develop additional weak, or bad loops, over and above those which were defined at the time of manufacture. As these loops deteriorate with time, they introduce errors into the data stream. In order to overcome these dynamic defects, error detecting, correcting and logging capabilities were included in bubble memory systems which generally relied on cyclic redundancy coding (CRC), or other suitable coding and decoding techniques. Examples of suitable error detecting and correcting schemes are shown in "A PROM-Based Decoder Detects and Corrects Errors" published in Electrical Design News June 20, 1980, and U.S. Pat. No. 4,345,328 issued Aug. 12, 1982. In the system disclosed in U.S. Pat. No. 4,345,328, single bit error correction and double bit error detection could be accomplished.

However, the occurrence of single bit errors which are correctable and identifiable with respect to data stored in a single storage loop is an indication that the loop is weakening, or aging. Frequent single bit errors caused by this weakening loop increase the probability of combination with a transient error from another loop causing a double bit, uncorrectable error. With prior systems it became necessary at this time to service the unit in order to eliminate weakening loops by replacing bubble memory chips.

Various other solutions to the problem of bad loops have been proposed. For example, in U.S. Pat. No. 3,909,810 which is directed to a major/minor loop organization, there was a suggestion that repeated failure of a parity check could cause a host computer to shift the data that was not lost to good minor loops from bad minor loops and to set a flag. This technique, however, did not contemplate error correction, was not applied to block replicate memory organization and resulted in a loss of some data, which in many applications cannot be tolerated.

Location of faulty elements in a content-addressable-memory through use of an EAPROM is disclosed in U.S. Pat. No. 4,376,300 issued Mar. 8, 1983. When this system was turned on, a program was read into the content addressable memory (CRAM) and it was suggested that this memory could also be programmed to recognize addresses of a newly failed element by utilization of a program which is read into the CRAM.

SUMMARY OF THE INVENTION

The present invention is directed to a bubble memory preferably of the block replicate or multi-block replicate type which is advantageous over the major/minor loop organization because it has a shorter access and cycle time and a simpler power down procedure. The invention utilizes error correction to form a dynamically self-healing memory organization which is effective both upon initial detection of an error in a loop and upon the detection or a predetermined number of errors caused by a given storage loop which indicates that the loop is deteriorating with time. A suitable memory, such as an electrically alterable programmable read only memory (EAPROM) that is divided into two sections may be used. One section of this memory called the read control section, is utilized to read data under control of "old" bad loop information (which eventually will be modified to spare out the offending loop). A second section, called the write control section, is used to contain "new" bad loop information which has already been updated to substituted a new previously unused loop for the loop that is being eliminated. Other types of memories such as PROMS, EAPROMS and RAMS may alternately be used to implement the present invention.

The bubble memory employs a deskewing and skewing arrangement and a buffer so that the bubble memory devices are read out and rewritten one page at a time. Each bit of the page is derived from a different storage loop. Error correction is applied to this data on the read so that single bit errors caused by the offending loop are corrected. This corrected information is then written back into the memory one page at a time substituting a good, previously unused loop in place of the offending one. When an EAPROM is used, the final step in the procedure is to copy the new bad loop data into the read control section of the EAPROM so that both the read and write control sections are identical after correction has been made.

The present invention is an improvement on the type of memory disclosed in U.S. Pat. No. 4,270,186 issued May 26, 1981. In the U.S. Pat. No. 4,270,186 the block replicate bubble memory device was disclosed which utilized a controller that supplied data to the host computer where it could be corrected or updated and supplied back to the memory. The controller contained a RAM which stored the information relating to the defective loops present upon manufacture.

The controller was part of an information processing loop which included deskewing logic and skewing logic so that the deskewing logic could arrange the skewed data words into a usable format, and the skewing logic would arrange the formatted words into skewed data words for storage back into the memory. However, the RAM of this system was not updated to correct for dynamic errors that occurred in the system. U.S. Pat. No. 4,270,186 is hereby incorporated by reference into the present document.

The present invention thus systematically and dynamically heals a bubble memory of the block replicate type. In this system, data is transferred from the original set of storage loops, which includes developing bad or weak storage loops, to a new set of storage loops which is substantially the same as the original except that it excludes the aforementioned offending storage loops and replaces it with a redundant, previously unused, good storage loop.

A deskewing circuit is employed to accept one page of data at a time, wherein each page contains one and only one data bit from the offending storage loop, and assembles it according to the bad loop information used to originally write the data. Single bit data errors caused by the offending loop are corrected before a skewing circuit disassembles the data according to a new set of bad loop information which identifies the offending storage loop as bad. The newly skewed data page is then rewritten to the storage loops. After each and every page in the memory has been processed in this manner once, the bad loop information used for memory reads is updated so that subsequent read operations assemble the data according to the same information as was used to disassemble and write it.

BRIEF DESCRIPTION OF THE DRAWING

The present invention is described by reference to the FIGURE which is a block diagram of the invention.

DETAILED DESCRIPTION OF THE INVENTION

A bubble memory system 10 which incorporates the present invention is schematically shown in the drawing. The system contains a large number of storage loops 12 which are used both for the storage of data bits and for the storage of error code bits. The memory is preferably implemented as a block replicate type which utilizes conventional components and a separate write track 14 so that a given page of data is written at one time, each bit in the page being stored in a different storage loop. The memory correspondingly has a read track 16 and utilizes conventional elements to read out one page at a time with each loop of the memory contributing one bit to the page read-out. In the block replicate mode, the stored information bits are translated from a parallel readout of the storage loops to a serial readout of data via the read track 16. A binary value of one is assigned to the presence of a bubble at any position in the storage loop 12, write track 14, and read track 16; a binary value of a zero is assigned to the absence of a bubble.

A large bubble memory containing on the order of 36,000 loops may have as many as 1,000 unused loops, which may be incorporated into the memory for subsequent use when a failure occurs in any of the presently employed loops. The information as to which of the loops in the memory are currently used is stored in the electrically alterable programmable read-only memory (EAPROM) 22. A logic 1 may be used to indicate the active loops of the memory and a logic 0 can be used to indicate inactive loops.

Control of the deskewing circuit 20 is maintained by the read control section 22 of the EAPROM signals coupled on the lines 24 to the deskewing circuit 20. The data bits from the deskewing circuit 20 are applied serially on the line 26 to the buffer and error correction circuit 28 which stores a number of bits of data and of error correction code that are associated with the data. For example, the data may be arranged in groups of twelve bytes of data per one byte of error code, for a total of 104 bits per error correcting word boundary.

The error correction technique employed in the error correcting circuit 28 may be any type of conventional error correcting technique, including Hamming code and other types of known cyclic redundancy code correcting techniques. In the described embodiment, it is desirable that the error correct technique utilized be one which corrects a single bit error and detects a double bit error in order to minimize the complexity of the system. After an error has been corrected, the corrected data is applied on the line 30 to a processor 32 and on the line 34 to the skewing circuit 36.

During normal read operation, the processor 32, in conjunction with the error correcting circuit 28, detects and logs any errors in the data that has been read from the memory. Memory loop data stored in the read control section 22 of the EAPROM is correspondingly fed to the processor 32 on the line 40 to enable it to determine which of the loops contained bad data bits while the error correcting circuit 28, in accordance with known error correcting schemes, corrects any single bit errors which occurred within an error correcting word boundary.

Upon completion of the normal read operation, the processor 32 examines the errors logged to determine if more than one error can be attributed to a single storage loop 12. If such is the case, the processor 32 declares that loop "bad", calculates a new set of bad loop information which spares out the offending loop, and writes this new bad loop information over line 42 into the write control section 44 of the EAPROM. The healing process for a memory with a defective loop is thus initiated.

A page of data is read from the storage loops 12 by transferring one data bit from each storage loop 12 to the read track 16. This data page is processed by the deskewing circuit 20 under control of the signals originating from the read control section 22 of the EAPROM 22 over lines 24. The control supplied by the read control section 22 of the EAPROM is identical to that supplied to the skewing circuit 36 by the write control section 44 of the EAPROM over lines 46 during a previous write operation.

It should be understood that the deskewing operation is the opposite of the skewing operation. The deskewing operation eliminates "holes", or data bits which originated from bad storage loops 12, in the data stream and discards them. The skewing operation on the other hand, inserts "holes" or data zeroes which are represented by the absence of a bubble, into the data stream such that no data will be written into those loops 12 which are identified to be bad.

Returning to the read portion of the healing process, the deskewing circuit which has reassembled the data stream into the same form as when originally previously written to the loops 12, passes the now continuous data stream composed of a single page from the bubble memory devices on to the error correcting circuits 28 over lines 26. The error correcting circuit 28 corrects single bit errors occurring within the boundaries of an error correcting word, most particularly those errors caused by the newly developed bad loop. The error correcting circuit 28 passes the corrected data on lines 34 to the skewing circuit 36.

The skewing circuit 36 inserts data bits with a value of zero into the data stream according to the information control signals supplied by the write control section 44 of the EAPROM on lines 46. It should be understood that the insertion of data bits with the value zero is the same as withholding data from the storage loop 12 to which the particular data bit would eventually be assigned for storage. Recalling that the write control section 44 of the EAPROM was previously written with new information by the processor 32, and that this new information contains data regarding the newly developed bad loop identifying it as such, the skewing circuit 36 is instructed to withhold data from the offending loop thus causing any data bit which previously would have been assigned to that offending loop, to instead be assigned to a different, previously unused good storage loop. The data stream is now advanced along the write track 14 and transferred into the storage loops 12 where each data bit is aligned with its assigned storage loop. It should be understood that the effect of these operations is to move one data bit, corrected if necessary, from the newly developed bad loop to a different, good storage loop.

The operations described above are repeated for each successive page until all of the pages have been processed. As each page is processed, one by one, each data bit originating from the newly developed bad loop is recovered through error correction techniques and transferred in the above prescribed manner from the offending loop to a new, previously unused loop.

Upon completion of the cycling of each and every page of data through the above prescribed process, the processor 32 initiates copying the entire contents of the write control section 44 of the EAPROM via the bus 50 to the read control section 22 of the EAPROM via the bus 48 so that henceforth the deskewing circuit 20 will receive the identical control signals (during externally initiated memory read operations) as the skewing circuit 36 receives during externally initiated memory write operations. This will ensure that during subsequent memory read operations the read data will be reassembled by the deskewing circuit 20 utilizing the same information as was used by the skewing circuit 36 during memory write operations.

What is claimed is:

1. A method of operating a magnetic bubble memory system that operates under the control of a stored loop control map comprising;
   reading data from storage loops,
   deskewing skewed data into a usable format,
   checking said data for errors,
   providing error correction to said data under predefined conditions,
   determining defective data storage loops on the basis of predetermined error checking criteria,
   transferring data from defective storage loops to unused good storage loops while said system is in operation, and
   correcting the loop control map for said memory system following said transfer while said system is in operation.

2. A method of operating a magnetic bubble memory system as claimed in claim 1 wherein deskewing is under the control of a read control section of a memory that stores said loop control map, skewing is under the control of a write control section of said memory and information in said write control section is copied into said read control section following the completion of the deskewing of said storage loops.

* * * * *